United States Patent
Jacques et al.

(10) Patent No.: US 8,335,604 B2
(45) Date of Patent: Dec. 18, 2012

(54) CONTROL SYSTEM AND METHOD FOR OXYGEN SENSOR HEATER CONTROL IN A HYBRID ENGINE SYSTEM

(75) Inventors: Robert Lionel Jacques, Troy, MI (US); Adam S. Kwiatkowski, Commerce, MI (US)

(73) Assignee: GM Global Technology Operations LLC

( * ) Notice: Subject to any disclaimer, the term of this patent is extended or adjusted under 35 U.S.C. 154(b) by 397 days.

(21) Appl. No.: 12/722,637

(22) Filed: Mar. 12, 2010

(65) Prior Publication Data
US 2011/0224851 A1    Sep. 15, 2011

(51) Int. Cl.
*G06F 19/00* (2011.01)
(52) U.S. Cl. ............................ 701/22; 180/65.28
(58) Field of Classification Search ............ 701/22, 701/102; 180/65.265, 65.28, 65.285; 60/320, 60/285, 286
See application file for complete search history.

(56) References Cited

U.S. PATENT DOCUMENTS

| | | | | |
|---|---|---|---|---|
| 4,332,225 A * | 6/1982 | Cox et al. | ......................... | 123/697 |
| 4,611,562 A * | 9/1986 | Nakano et al. | ............... | 73/23.32 |
| 4,993,392 A * | 2/1991 | Tanaka et al. | ................ | 73/23.32 |
| 2003/0172643 A1* | 9/2003 | Suzuki | ............................. | 60/284 |
| 2003/0213795 A1* | 11/2003 | Toyoda | .......................... | 219/501 |
| 2004/0035127 A1* | 2/2004 | Adaniya et al. | ................. | 62/236 |
| 2005/0155803 A1* | 7/2005 | Schiele | ......................... | 180/65.2 |
| 2008/0275600 A1* | 11/2008 | Rask et al. | ..................... | 701/22 |
| 2010/0094493 A1* | 4/2010 | Atsumi | ........................... | 701/22 |

FOREIGN PATENT DOCUMENTS

JP     2001065437    * 3/2001

* cited by examiner

*Primary Examiner* — Thomas Black
*Assistant Examiner* — Marthe Marc-Coleman

(57) ABSTRACT

A control system for a hybrid engine system includes a torque management module and an engine control module. The torque management module operates an electric machine of the hybrid engine system for a period prior to starting an engine of the hybrid engine system for a first time during a current run cycle of the hybrid engine system. The engine control module selectively activates a heater for an oxygen sensor of an exhaust system of the engine during the period. The engine control module may selectively activate the heater prior to the period when an ignition switch for the hybrid engine system moves from an off state into an on state. The engine control module may increase the temperature of the oxygen sensor to a predetermined temperature based on one of a thermal shock temperature and a sensitivity temperature of the oxygen sensor. A related method is also provided.

20 Claims, 3 Drawing Sheets

CONTROL SYSTEM AND METHOD FOR OXYGEN SENSOR HEATER CONTROL IN A HYBRID ENGINE SYSTEM

FIELD

The present disclosure relates to control systems and methods for an internal combustion engine of a hybrid engine system and, more particularly, to control systems and methods for an oxygen sensor of an exhaust system of the engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motor vehicles may include an engine system that produces drive torque that is transmitted through a transmission to a drivetrain to drive wheels of the vehicle. The engine system may be a hybrid engine system that includes an internal combustion engine and one or more electric machines. In various configurations, the engine and the electric machines may be independently coupled to the transmission. In such configurations, the engine, the electric machines, or a combination thereof, may be operated to supply torque to the transmission and thereby propel the vehicle.

Control systems have been developed to control the operation of the engine and the electric machines of hybrid engine systems. The control systems may control the operation to achieve improved fuel economy and reduced exhaust emissions. The control systems may control when the engine and the electric machines are operated. The control systems may also control the torque output by the engine and the electric machines.

To achieve improved fuel economy and emissions, the control systems may control operation using a closed-loop fueling process to more accurately control an air-to-fuel (A/F) ratio of the air and fuel combusted by the engine. Generally, engines are operated at or near a stoichiometric A/F ratio. The stoichiometric A/F ratio is defined as an ideal mass ratio of air to fuel for balanced combustion. The stoichiometric A/F ratio varies depending on the particular fuel used for combustion. The engine operates in a lean condition when the A/F ratio is greater than the stoichiometric ratio. The engine operates in a rich condition when the A/F ratio is less than the stoichiometric A/F ratio.

In the closed-loop fueling process, feedback from one or more sensors is used to more accurately control the A/F ratio. The feedback may be used to determine scaling factors that are used to adjust the amount of fuel delivered to the engine. The scaling factors are sometimes referred to as fuel trim values. Typically, one or more oxygen sensors located in an exhaust system of the engine are used as the primary feedback mechanism. Each of the oxygen sensors generates an output indicative of an oxygen content sensed in the exhaust. From the output, the control system can determine whether the engine is operating in a lean or rich condition. To function properly, the oxygen sensors must be operated at or above a temperature referred to as a sensitivity temperature. During periods when the oxygen sensors are not functioning properly, the control systems may control operation using an open-loop fueling process that does not obtain feedback from the sensors.

SUMMARY

In one form, the present disclosure provides a control system for a hybrid engine system that includes a torque management module and an engine control module. The torque management module operates an electric machine of the hybrid engine system for a period prior to starting an engine of the hybrid engine system for a first time during a current run cycle of the hybrid engine system. The engine control module selectively activates a heater for an oxygen sensor of an exhaust system of the engine during the period.

In one feature, the engine control module may selectively activate the heater prior to the period when an ignition switch for the hybrid engine system moves from an off state into an on state. In another feature, the engine control module may activate the heater until the engine is started.

In related features, the engine control module may increase a temperature of the oxygen sensor above a sensitivity temperature of the oxygen sensor during the period. In other related features, the engine control module may maintain the temperature above the sensitivity temperature during the period.

In other features, the engine control module may increase the temperature of the oxygen sensor to a predetermined temperature based on a thermal shock temperature of the oxygen sensor. In a related feature, the predetermined temperature may be below a sensitivity temperature of the oxygen sensor.

In still other features, the heater may be a resistive heater. In related features, the engine control module may supply power to the resistive heater. In other related features, the resistive heater may be formed integral with a sensing element of the oxygen sensor.

In another form, the present disclosure provides a method for controlling a hybrid engine system that includes operating an electric machine of the hybrid engine system for a period prior to starting an engine of the hybrid engine system for a first time during a current run cycle of the hybrid engine system, and selectively activating a heater for an oxygen sensor of an exhaust system of the engine during the period.

In one feature, the method may further include selectively activating the heater prior to the period when an ignition switch for the hybrid engine system moves from an off state into an on state. In another feature, the selectively activating the heater may include activating the heater until the engine is started. In related features, the selectively activating the heater may include increasing a temperature of the oxygen sensor above a sensitivity temperature of the oxygen sensor during the period. In other related features, the selectively activating the heater may further include maintaining the temperature above the sensitivity temperature during the period.

In other features, the selectively activating the heater may include increasing a temperature of the oxygen sensor to a predetermined temperature based on a thermal shock temperature of the oxygen sensor. In a related feature, the predetermined temperature may be below a sensitivity temperature of the oxygen sensor.

In still other features, the heater may be a resistive heater. In related features, the selectively activating the heater may include supplying power to the resistive heater. In other related features, the resistive heater may be formed integral with a sensing element of the oxygen sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
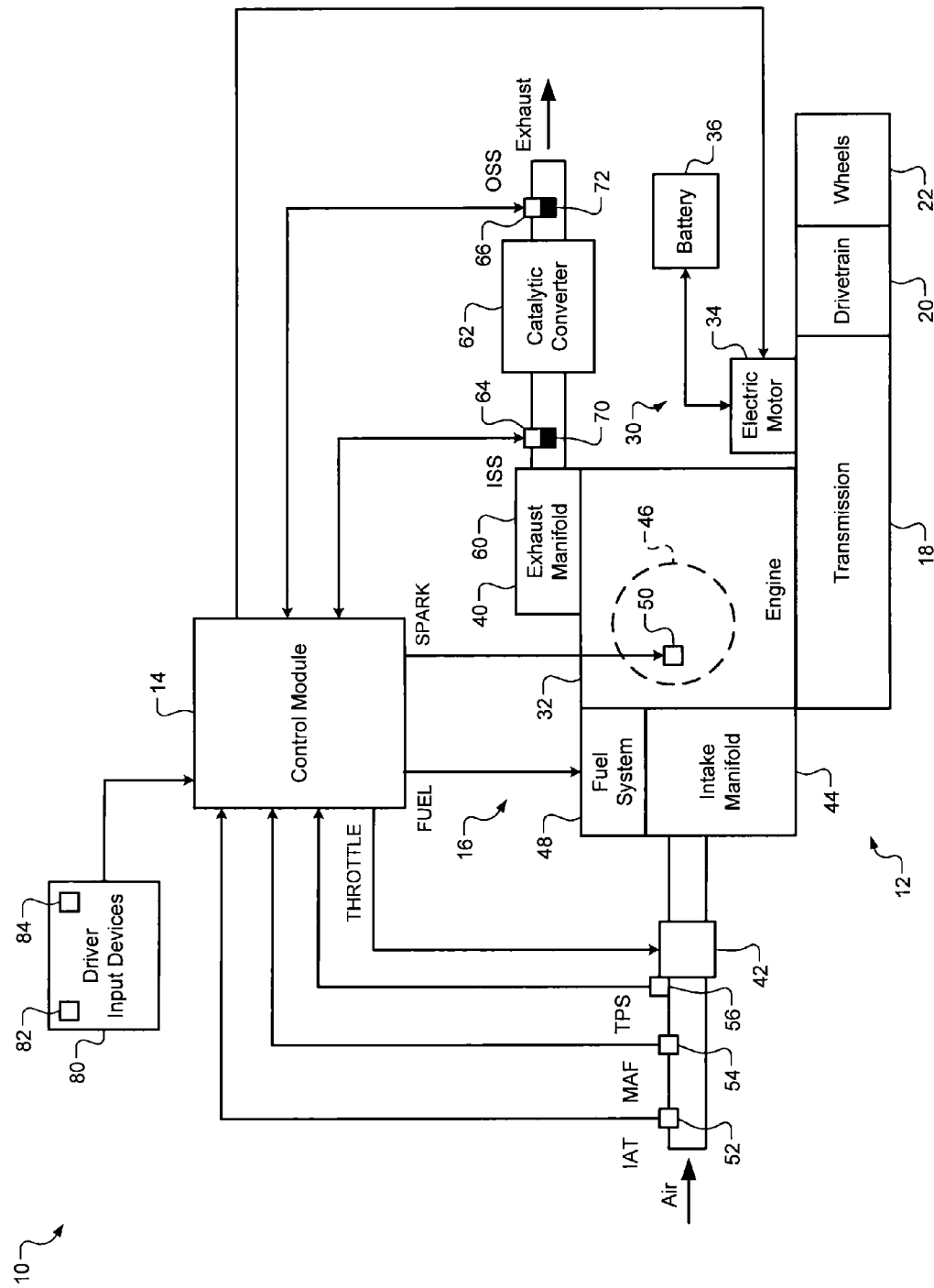
FIG. 1 is a functional block diagram illustrating an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

During the operation of a hybrid electric vehicle, the electric machines may be operated for a period until it is desired to operate the engine. Subsequently, the engine may be started and operated. Upon starting, an open-loop fueling process may be used to control the NF ratio of the engine for a period. The open-loop fueling process may be used while the oxygen sensors used for feedback during a subsequent closed-loop fueling process are heated above their sensitivity temperatures and a catalytic converter of the engine is heated above its light-off temperature. In spark-ignition direct injection engines using split injection during the open-loop fueling process, the A/F mixture may be biased in a rich condition during catalyst light-off to avoid a lean misfire condition.

Conventional hybrid systems activate the oxygen sensor heaters after starting the engine. The present disclosure provides a control system and method for selectively activating the oxygen sensor heaters prior to starting the engine. According to the present disclosure, the oxygen sensor heaters may be activated at key-on. Activating the oxygen sensor heaters at key-on may increase the temperature of the oxygen sensors prior to starting the engine and may thereby enable earlier closed-loop fuel control of the engine after startup.

The increased temperatures of the oxygen sensors can enable closed-loop fuel control during a catalyst light-off process performed after starting the engine. Closed-loop fuel control during the catalyst light-off process enables stoichiometric A/F ratios during catalyst light-off, which may lower hydrocarbon emissions during the catalyst light-off process. Earlier closed-loop fuel control can enable the determination of fuel trim values during the catalyst light-off process. As such, earlier closed-loop fuel control can enable the determination of fuel trim values in split injection systems that produce a stratified charge.

With particular reference to FIG. 1, an exemplary vehicle system 10 according to the present disclosure is shown. The vehicle system 10 includes a powertrain 12 controlled by a control module 14. The powertrain 12 includes a hybrid engine system 16 that produces drive torque that may be transmitted through a transmission 18 at one or more gear ratios to a drivetrain 20 to drive wheels 22 of a vehicle (not shown).

The hybrid engine system 16 includes an electric machine (EM) 30 and an internal combustion engine 32. As discussed herein, the hybrid engine system 16 is of a type in which the EM 30 may produce sufficient drive torque to propel the vehicle independent of the engine 32. It should be understood, however, that the engine 32 may also produce sufficient drive torque to propel the vehicle independent of the EM 30.

The EM 30 includes one or more electric motors 34 rotationally coupled to the transmission 18, and a battery 36. For simplicity, a single electric motor 34 is shown. The electric motor 34 may be in electrical communication with the battery 36 and when operated in a power generation mode, may convert electrical power supplied by the battery 36 into mechanical power (i.e., torque) that is supplied to the transmission 18. When operated in a charging mode, the electric motor 34 may function as a generator for recharging the battery 36. In the charging mode, the electric motor 34 may convert torque supplied by the transmission 18 into electrical power that is used to recharge the battery 36.

The engine 32 combusts a mixture of air and fuel in one or more combustion chambers and thereby produces drive torque. The engine 32 includes an exhaust system 40, discussed below, that treats the exhaust produced during combustion. The engine 32 may be a spark-ignition engine or a compression-ignition engine. The engine 32 may be one of several types including, but not limited to, a reciprocating-type engine and a rotary-type engine. The engine 32 may have one of several configurations such as, but not limited to, an in-line configuration and a V-type configuration.

In an exemplary implementation of the engine 32, air may be drawn through a throttle 42 and an intake manifold 44 into cylinders 46 by pistons (not shown) that reciprocate within the cylinders 46. For simplicity, a single cylinder 46 is shown. Fuel may be supplied to the cylinder 46 by a fuel system 48. Energy for igniting the mixture of air and fuel may be provided by a spark plug 50 located within the cylinder 46. Exhaust produced by combustion may exit the engine 32 into the surroundings via the exhaust system 40.

The engine 32 may include sensors for sensing various operating conditions. For example, the engine 32 may include an intake air temperature (IAT) sensor 52, a mass air flow (MAF) sensor 54, and a throttle position (TPS) sensor 56. The IAT sensor 52 may be located upstream of the throttle 42 and may sense a temperature of the air entering the throttle 42. The IAT sensor may generate an IAT signal indicative of the temperature sensed. The MAF sensor 54 may be located upstream of the throttle 42 and may sense a MAF of the air entering the throttle 42. The MAF sensor 54 may generate a MAF signal indicative of the MAF sensed. The TPS sensor 56 may sense a position of a butterfly valve (not shown) of the throttle 42 and may generate a TPS signal indicative of the position sensed.

The exhaust system 40 may include an exhaust manifold 60, a catalytic converter 62, a pre-catalyst oxygen ($O_2$) sensor 64, and a post-catalyst $O_2$ sensor 66. The exhaust manifold 60 may receive the exhaust exiting the cylinder 46 and may be fluidly coupled to the catalytic converter 62 via exhaust piping. The catalytic converter 62 may treat the exhaust and may be a three-way catalytic converter that reduces the emission of $NO_X$, CO, and HC in the exhaust. As such, the catalytic converter 62 may reduce $NO_X$ to nitrogen and oxygen, may oxidize CO to $CO_2$, and may oxidize HC to $CO_2$ and $H_2O$. To function properly, the catalytic converter 62 may have to be operated at a temperature at or above a catalyst light-off temperature.

The pre-catalyst $O_2$ sensor 64 and the post-catalyst $O_2$ sensor 66 may be located upstream and downstream of the catalytic converter 62, respectively, and may sense an oxygen content of the exhaust. As such, the pre-catalyst $O_2$ sensor 64 may sense the oxygen content of the exhaust entering the catalytic converter 62 and the post-catalyst $O_2$ sensor 66 may sense the oxygen content of the exhaust exiting the catalytic converter 62. The pre-catalyst $O_2$ sensor 64 and the post-catalyst $O_2$ sensor 66 may output an inlet sensor signal (ISS) and an outlet sensor signal (OSS), respectively, indicative of the oxygen content sensed. The ISS and OSS signals may be voltage signals that vary based on the oxygen content sensed. The pre-catalyst $O_2$ sensor 64 and the post-catalyst $O_2$ sensor 66 may be of the narrow-band type or of the wide-band type.

The pre-catalyst $O_2$ sensor 64 and the post-catalyst $O_2$ sensor 66 may include auxiliary heaters 70, 72, respectively, that may be activated to heat sensing elements within the corresponding $O_2$ sensor above a sensitivity temperature. The auxiliary heaters 70, 72 may be resistive heaters that are activated by supplying power to the auxiliary heaters 70, 72. Each of the auxiliary heaters 70, 72 may be integrally formed with the sensing element of the corresponding $O_2$ sensor.

The control module 14 controls operation of the various components of the vehicle system 10, including the hybrid engine system 16. The control module 14 may control operation by outputting control signals to the various components. The control module 14 may control operation based on signals received from various driver input devices 80 manipulated by a driver of the vehicle. The control module 14 may further control operation based on signals received from various sensors of the vehicle system 10, such as the IAT sensor 52, the MAF sensor 54, the TPS sensor 56, and the pre-catalyst and post-catalyst $O_2$ sensors 64, 66.

The driver input devices 80 may include an ignition switch 82 and an accelerator pedal 84. The ignition switch 82 may be a conventional multi-position switch operated by the driver to indicate a desired operating state of the vehicle system 10. For example, the ignition switch 82 may have an "OFF" position, an "ON" position, and a "RUN" position.

The OFF position may correspond to an operating state in which the vehicle system 10 is not operated (i.e., is shut down). In the OFF position, power may be supplied to the control module 14 to operate certain processes during periods of in-operation. For example, power may be supplied to maintain memory processes during periods of in-operation.

The ON position may correspond to an operating state in which electrical power is supplied to various components of the vehicle system 10, however the hybrid engine system 16 is not operated to produce drive torque. In the ON position, power may be supplied to the control module 14 that enables full functionality of the control module 14.

The RUN position may correspond to an operating state in which power is supplied to the various components of the vehicle system 10 and the hybrid engine system 16 is operated to produce drive torque and thereby propel the vehicle.

The ignition switch 82 may be a rotary switch that transitions from OFF to ON to RUN in one direction and from RUN to ON to OFF in an opposite direction. For purposes of the present disclosure, the OFF position corresponds to an off state of the ignition switch 82, while the ON and RUN positions correspond to an on state of the ignition switch 82. Additionally, the term run cycle will be used to refer to a period beginning when the ignition switch 82 moves into the RUN position and ending when the ignition switch moves out of the RUN position.

The accelerator pedal 84 may be of a conventional type operated by the driver to indicate a desired torque output of the hybrid engine system 16.

The control module 14 controls the starting, stopping, and torque output of the hybrid engine system 16. In particular, the control module 14 controls operation of the engine 32 and the EM 30 and the torque output by each.

The control module 14 may control the torque output by the engine 32 by controlling the amount of air and fuel entering the cylinder 46. The control module 14 may further control the amount of air and fuel supplied such that a desired air-fuel (A/F) mixture is achieved in the cylinder 46. The A/F ratio may be controlled to improve fuel economy and control emissions.

The control module 14 may use a closed-loop fueling process to control the A/F ratio based on the output of one or more of the sensors. The ISS signal output by the pre-catalyst $O_2$ sensor 64 may provide the primary feedback on which control of the A/F ratio is based. The OSS signal output by the post-catalyst $O_2$ sensor 66 may provide secondary feedback on which control of the A/F ratio is based. During periods when the output of the pre-catalyst and post-catalyst $O_2$ sensors 64, 66 are unreliable, the control module 14 may use an open-loop fueling process for controlling the A/F ratio. The output may be unreliable during periods when the pre-catalyst and post-catalyst $O_2$ sensors 64, 66 are operating below their sensitivity temperatures, such as when the engine 32 has not operated for a prolonged period.

According to the present disclosure, the control module 14 selectively activates the auxiliary heaters 70, 72 to heat the pre-catalyst and post-catalyst $O_2$ sensors 64, 66 when the ignition switch 82 is moved from the OFF position into one of the ON position and the RUN position. Once the ignition switch has moved into the RUN position, the control module 14 may operate the EM 30 for a period prior to starting the engine 32 to propel the vehicle. During the period of operating the EM 30, the control module 14 may continue to activate the auxiliary heaters 70, 72. In this manner, the control module 14 may increase the temperatures of the pre-catalyst and post-catalyst $O_2$ sensors 64, 66 prior to starting the engine 32. The increased temperatures can enable earlier closed-loop fuel control than would otherwise be possible without pre-heating the pre-catalyst and post-catalyst $O_2$ sensors 64, 66.

Figure 2:
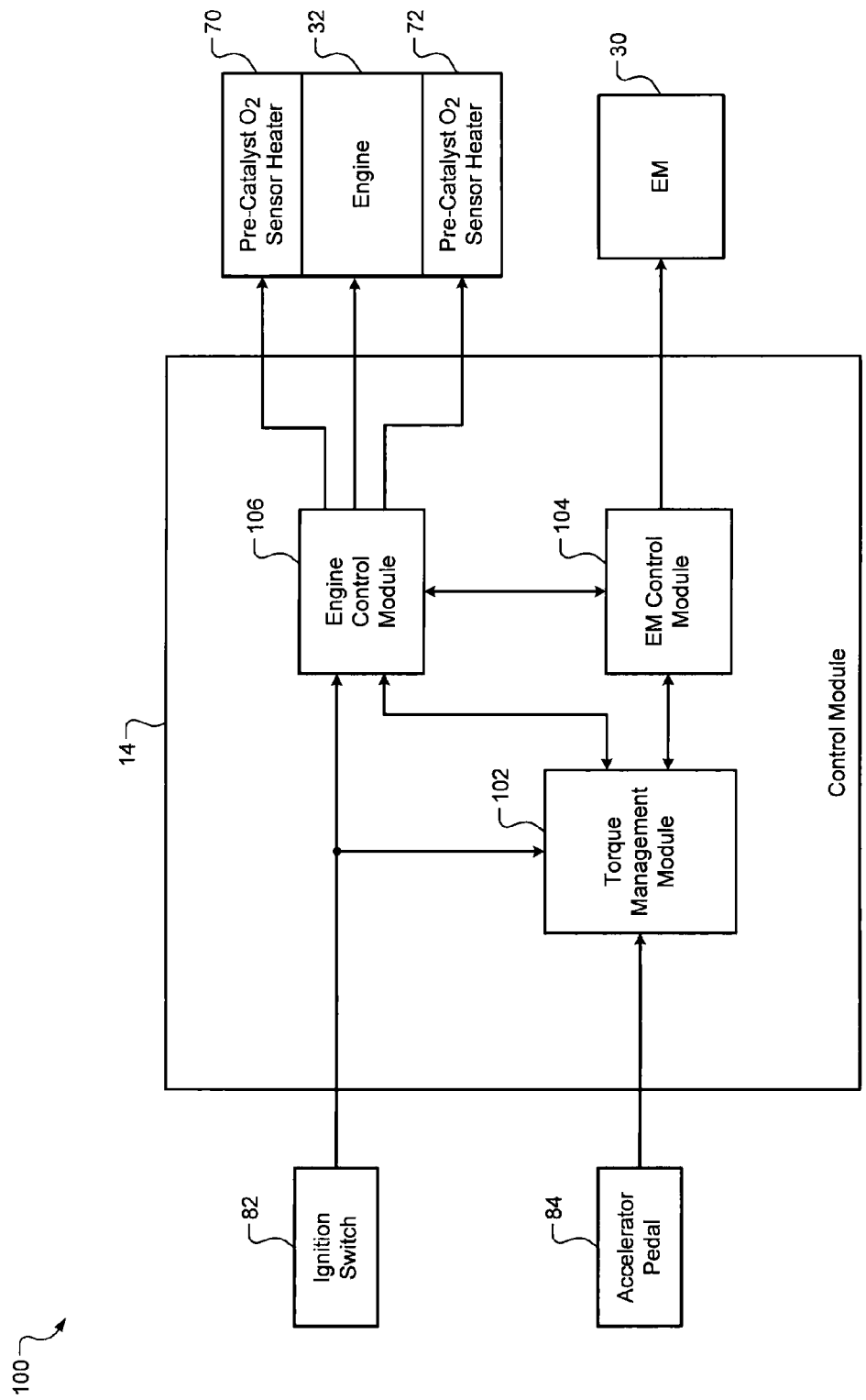
FIG. 2 is a functional block diagram illustrating an exemplary control system according to the present disclosure.

With particular reference to FIG. 2, an exemplary implementation of the control module 14 in an exemplary control system 100 for the hybrid engine system 16 is shown. The control module 14 may include a torque management (TM) module 102, an EM control module 104, and an engine control module (ECM) 106. The TM module 102 may determine the desired operating state and the desired drive torque based on signals received from the ignition switch 82 and the accelerator pedal 84. Based on the desired operating state and desired drive torque, the TM module 102 may determine a first desired torque output for the EM 30 and a second desired torque output for the engine 32.

Based on the desired operating state and the desired drive torque, the TM module 102 may instruct the EM control module 104 and the ECM 106 when to operate the engine 32 and the EM 30, respectively. During periods when the desired drive torque may be met by operating the EM 30 alone, the TM module 102 may delay the starting of the engine 32 or may instruct the ECM 106 to shut down the engine 32. The TM module 102 may further instruct the EM control module 104 to operate the EM 30 to produce the first desired torque output. The TM module 102 may also instruct the ECM 106 to operate the engine 32 to produce the second desired torque output.

The EM control module 104 may receive various signals, including the instructions generated by the TM module 102, and may control the operation of the EM 30 based on the signals received. The EM control module 104 may control the torque output of the EM 30 according to the instructions received by controlling the power supplied by the battery 36 to the electric motor 34. The EM control module 104 may communicate information regarding the operation of the EM 30 with the TM module 102 and the ECM 106. In this manner, the TM module 102, the EM control module 104, and the ECM 106 may work together to smoothly meet the desired drive torque.

The ECM 106 may receive various signals, including the signal generated by the ignition switch 82 and the instructions generated by the TM module 102. The ECM 106 may control the operation of the engine 32 based on the signals received. The ECM 106 may control the starting and stopping of the engine 32 based on the instructions received. The ECM 106 may control the torque output of the engine 32 according to the instructions received by controlling various operating parameters, such as the amount of air and fuel supplied to the engine 32, and engine spark timing. The ECM 106 may communicate information regarding the operation of the engine 32 with the TM module 102 and the EM control module 104 that may enable the modules to work together to smoothly meet the desired drive torque.

According to the present disclosure, the ECM 106 may control the operating temperatures of the pre-catalyst and post-catalyst $O_2$ sensors 64, 66 by controlling operation of the auxiliary heaters 70, 72. As discussed in further detail below, the ECM 106 may selectively activate the auxiliary heaters 70, 72 to heat the pre-catalyst and post-catalyst $O_2$ sensors 64, 66 when the ignition switch 82 is moved from the OFF position into one of the ON position and the RUN position.

Figure 3:
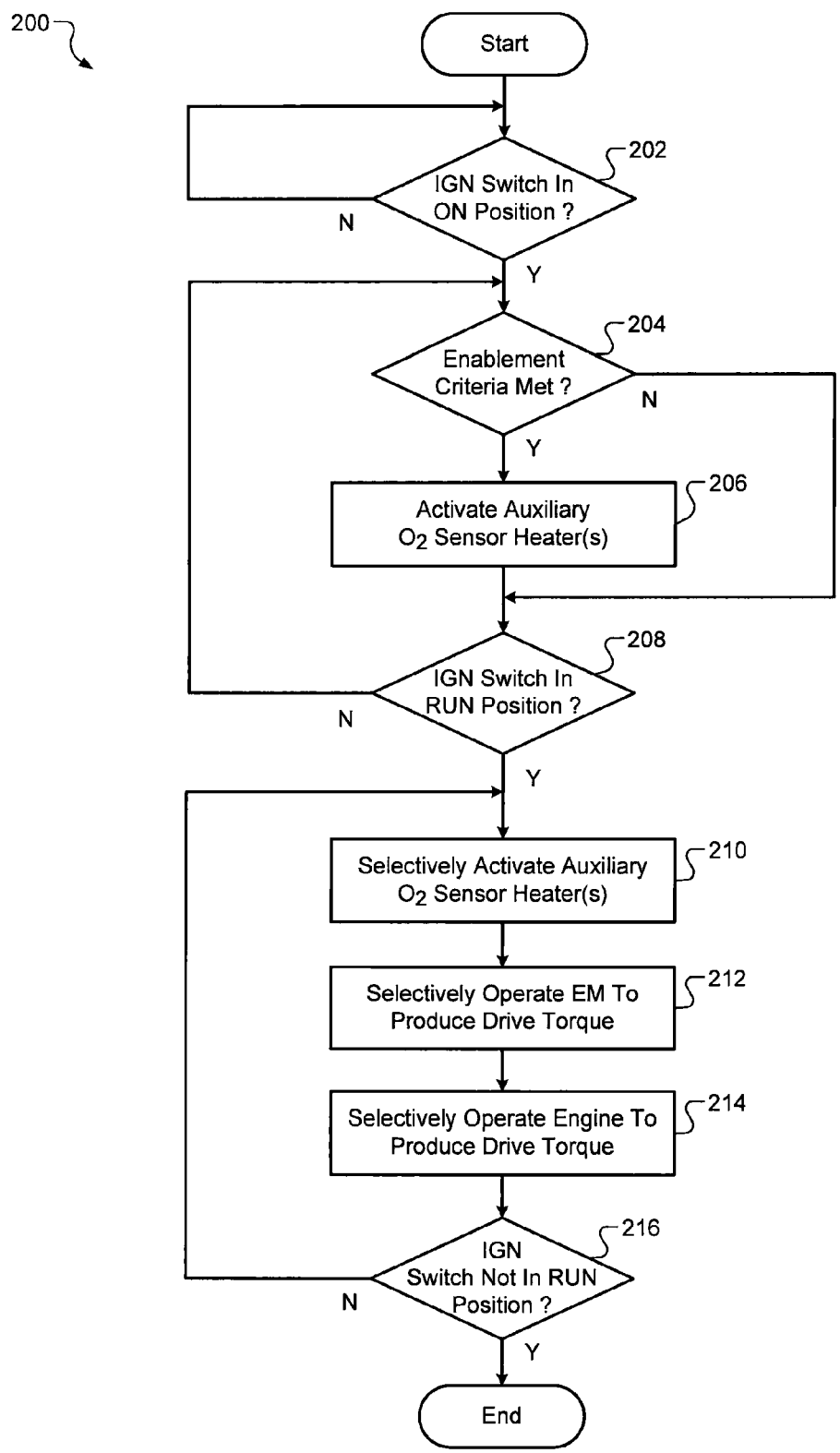
FIG. 3 is a flow diagram illustrating exemplary steps in a method for controlling a hybrid engine system according to the present disclosure.

With particular reference to FIG. 3, exemplary steps in a method 200 for controlling the hybrid engine system 16 according to the present disclosure is shown. In particular, the method 200 illustrates exemplary steps that may be performed by the control module 14 to selectively activate the auxiliary heaters 70, 72 prior to starting the engine 32 for a first time based on the position of the ignition switch 82.

The method 200 begins in step 202 where the ECM 106 determines whether the ignition switch 82 has moved from the OFF position into the ON position. If yes, then control may proceed in step 204, otherwise control may loop back as shown.

In step 204, the ECM 106 may determine whether enablement criteria for activating each of the auxiliary heaters 70, 72 are met. If yes, then control may proceed in step 206, otherwise control may proceed in step 208. The enablement criteria for each of the auxiliary heaters 70, 72 may include whether a fault has been detected with the corresponding oxygen sensor and/or the auxiliary heater, whether an estimated temperature of the corresponding oxygen sensor is within a predetermined temperature of its sensitivity temperature, and whether activating the auxiliary heater may cause thermal shock damage to the corresponding oxygen sensor. The enablement criteria may further include whether the auxiliary heaters 70, 72 have been activated for a period greater than a predetermined period while the ignition switch has remained in the ON position.

In step 206, the ECM 106 independently activates the auxiliary heaters 70, 72 to heat the pre-catalyst and post-catalyst $O_2$ sensors 64, 66. The ECM 106 may activate the auxiliary heaters 70, 72 for a predetermined first period. Alternately or additionally, the ECM 106 may activate the auxiliary heaters 70, 72 to increase the estimated temperature of the corresponding oxygen sensor to a predetermined temperature within a predetermined temperature range. The ECM 106 may continue to activate the auxiliary heaters 70, 72 to maintain the estimated temperature within the predetermined temperature range. The predetermined temperature range may be above a sensitivity temperature of the corresponding oxygen sensor. Alternately or additionally, the predetermined temperature range may be below an estimated thermal shock temperature of the corresponding oxygen sensor. The estimated thermal shock temperature may be an estimated temperature at or above which cooler moisture in the exhaust that may come in contact with the oxygen sensor may cause damage to the oxygen sensor.

Control may proceed in step 206 where the ECM 106 determines whether the ignition switch 82 has moved from the ON position into the RUN position. If yes, then control may proceed in step 210, otherwise control may return to step 204.

In step 210, the ECM 106 selectively activates the auxiliary heaters 70, 72. The ECM 106 may continue to activate the auxiliary heaters 70, 72 according to step 206. Alternately, the ECM 106 may activate the auxiliary heaters 70, 72 to maintain the estimated temperatures of the pre-catalyst and post-catalyst $O_2$ sensors 64, 66 above their corresponding sensitivity temperatures. The ECM 106 may maintain the estimated temperatures in the foregoing manner until the engine is started in a subsequent step.

In step 212, the EM control module 104 selectively operates the EM 30. The EM control module 104 may control the torque output by the EM 30 based on the instructions generated by the TM module 102. The EM control module 104 may operate the EM 30 for a period prior to the ECM 106 starting the engine 32 for a first time.

In step 214, the ECM 106 selectively operates the engine 32. The ECM 106 may start, stop, and control the torque output of the engine 32 based on the instructions generated by the TM module 102.

In step 216, the TM module 102 determines whether the ignition switch 82 has moved from the RUN position into one of the ON position and the OFF position. If yes, then control under the method 200 ends, otherwise control returns in step 210 and may proceed as discussed above.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a hybrid engine system comprising:
 a torque management module that operates an electric machine of said hybrid engine system for a period prior to starting an engine of said hybrid engine system for a first time during a current run cycle of said hybrid engine system; and
 an engine control module that selectively activates a heater for an oxygen sensor of an exhaust system of said engine during said period if an estimated temperature of said oxygen sensor is within a predetermined value of a sensitivity temperature of said oxygen sensor, wherein said oxygen sensor senses oxygen when operated at or above said sensitivity temperature.

2. The control system of claim 1 wherein said engine control module selectively activates said heater prior to said period when an ignition switch for said hybrid engine system moves from an off state into an on state.

3. The control system of claim 1 wherein said engine control module activates said heater until said engine is started.

4. The control system of claim 1 wherein said engine control module increases a temperature of said oxygen sensor above said sensitivity temperature of said oxygen sensor during said period.

5. The control system of claim 4 wherein said engine control module maintains said temperature above said sensitivity temperature during said period.

6. The control system of claim 1 wherein said engine control module increases a temperature of said oxygen sensor to a predetermined temperature based on a thermal shock temperature of said oxygen sensor.

7. The control system of claim 6 wherein said predetermined temperature is below said sensitivity temperature of said oxygen sensor.

8. The control system of claim 1 wherein said heater is a resistive heater and wherein said engine control module supplies power to said resistive heater.

9. The control system of claim 8 wherein said resistive heater is formed integral with a sensing element of said oxygen sensor.

10. The control system of claim 1 wherein said engine control module activates said heater to increase said estimated temperature of said oxygen sensor to a predetermined temperature within a predetermined temperature range, wherein said predetermined temperature range is above said sensitivity temperature of said oxygen sensor or below an estimated thermal shock temperature of said oxygen sensor, and wherein said estimated thermal shock temperature is a temperature at or above which moisture in exhaust contacts said oxygen sensor.

11. A method for controlling a hybrid engine system comprising:
using a processor:
operating an electric machine of said hybrid engine system for a period prior to starting an engine of said hybrid engine system for a first time during a current run cycle of said hybrid engine system; and
selectively activating a heater for an oxygen sensor of an exhaust system of said engine during said period if an estimated temperature of said oxygen sensor is within a predetermined value of a sensitivity temperature of said oxygen sensor, wherein said oxygen sensor senses oxygen when operated at or above said sensitivity temperature.

12. The method of claim 11 further comprising selectively activating said heater prior to said period when an ignition switch for said hybrid engine system moves from an off state into an on state.

13. The method of claim 11 wherein said selectively activating said heater includes activating said heater until said engine is started.

14. The method of claim 11 wherein said selectively activating said heater includes increasing a temperature of said oxygen sensor above said sensitivity temperature of said oxygen sensor during said period.

15. The method of claim 14 wherein said selectively activating said heater further includes maintaining said temperature above said sensitivity temperature during said period.

16. The method of claim 11 wherein said selectively activating said heater includes increasing a temperature of said oxygen sensor to a predetermined temperature based on a thermal shock temperature of said oxygen sensor.

17. The method of claim 16 wherein said predetermined temperature is below said sensitivity temperature of said oxygen sensor.

18. The method of claim 11 wherein said heater is a resistive heater and wherein said selectively activating said heater includes supplying power to said resistive heater.

19. The method of claim 18 wherein said resistive heater is formed integral with a sensing element of said oxygen sensor.

20. The method of claim 11 wherein said selectively activating said heater includes increasing said estimated temperature of said oxygen sensor to a predetermined temperature within a predetermined temperature range, wherein said predetermined temperature range is above said sensitivity temperature of said oxygen sensor or below an estimated thermal shock temperature of said oxygen sensor, and wherein said estimated thermal shock temperature is a temperature at or above which moisture in exhaust contacts said oxygen sensor.

* * * * *